United States Patent
Gooch et al.

(10) Patent No.: US 8,315,169 B2
(45) Date of Patent: Nov. 20, 2012

(54) LOADBALANCING NETWORK TRAFFIC ACROSS MULTIPLE REMOTE INSPECTION DEVICES

(75) Inventors: Mark Gooch, Roseville, CA (US);
Bruce E. LaVigne, Roseville, CA (US);
Steven Glen Jorgensen, Newcastle, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/150,830

(22) Filed: Jun. 1, 2011

(65) Prior Publication Data

US 2011/0231933 A1     Sep. 22, 2011

Related U.S. Application Data

(62) Division of application No. 12/315,780, filed on Dec. 5, 2008, now Pat. No. 7,965,636.

(51) Int. Cl.
*H04L 12/26*     (2006.01)

(52) U.S. Cl. .......................................... 370/235; 726/23
(58) Field of Classification Search .................. None
See application file for complete search history.

(56) References Cited

U.S. PATENT DOCUMENTS

| | | | |
|---|---|---|---|
| 6,463,475 B1 | 10/2002 | Calhoun | |
| 6,578,147 B1 | 6/2003 | Shanklin et al. | |
| 6,954,775 B1 | 10/2005 | Shanklin et al. | |
| 7,039,641 B2 | 5/2006 | Woo | |
| 7,093,002 B2 | 8/2006 | Wolff et al. | |
| 7,406,524 B2 | 7/2008 | Sadot et al. | |
| 7,558,261 B2 | 7/2009 | Arregoces et al. | |
| 2005/0044406 A1* | 2/2005 | Stute | 713/201 |
| 2005/0131583 A1* | 6/2005 | Ransom | 700/295 |
| 2005/0207420 A1 | 9/2005 | Shanklin et al. | |
| 2006/0026669 A1 | 2/2006 | Zakas | |
| 2006/0136575 A1* | 6/2006 | Payne et al. | 709/219 |
| 2007/0097976 A1 | 5/2007 | Wood et al. | |
| 2007/0280222 A1 | 12/2007 | Smith et al. | |
| 2008/0270399 A1 | 10/2008 | Feng et al. | |
| 2008/0298392 A1 | 12/2008 | Sanchez et al. | |
| 2009/0217369 A1 | 8/2009 | Abeni et al. | |
| 2010/0142539 A1 | 6/2010 | Gooch et al. | |

* cited by examiner

*Primary Examiner* — Min Jung

(57) ABSTRACT

An apparatus includes a checking functionality (CF) for processing data packets in a computer network that comprises a plurality of CFs. The CF includes an interface for communication with one or more source switches that route data packets to the CF for processing, a packet processing capability for processing the data packets, and logic for communicating data regarding the packet processing capability to the source switch through the interface.

19 Claims, 6 Drawing Sheets

CF CAPABILITIES TABLE 460

| TUNNEL/CF NUMBER 461 | DESTINATION SWITCH IP ADDRESS 462 | CF CAPABILITIES 463 | CF COST METRIC 464 | TRANSMITTED PACKET/BYTE COUNT 465 | SECURITY/AUTHENTICATION INFORMATION 466 |
|---|---|---|---|---|---|
| 0 (CF-1) | IP-D1 | FILE TRANSFER ADVANCED VIRUS DETECTION | 3 | P0, b0 | KeyS0 |
| 1 (CF-2) | IP-D2 | WEB TRAFFIC EMAIL TRAFFIC FIRE WALLING | 2 | P1, b1 | KeyS1 |
| ... | ... | ... | ... | ... | ... |
| N (CF-N) | IP-DN | | 1 | PN, bN | KeySN |

Fig. 4

| No. | IP_SA | IP_DA | Service | CF device |
|---|---|---|---|---|
| 1 | mark1 | mail_server | smtp | none. |
| 2 | mark1 | mail_server | pop3 | none. |
| 3 | mark1 | print_server | any | none. |
| 4 | mark1 | local_server | ftp | none. |
| 5 | mark1 | remote_server | ftp | 1. |
| 6 | mark1 | external_server | ftp | 2. |
| 7 | mark1 | internal_web_server | http | none. |
| 8 | mark1 | external_web_server | http | 3. |
| 9 | mark1 | local_server | ssh | none. |
| 10 | mark1 | remote_accounting_server | any | 1. |
| 11 | mark1 | remote_server | ssh | 3. |
| 12 | mark1 | external_server | ssh | DENY. |

Fig. 5A

| No. | ip_sa | ip_da | ip_proto | src_port | dst_port | action |
|---|---|---|---|---|---|---|
| 1 | 10.15.16.1/32 | 10.15.1.1/32 | 6 | X | 25 | PERMIT |
| 2 | 10.15.16.1/32 | 10.15.1.1/32 | 6 | X | 110 | PERMIT |
| 3 | 10.15.16.1/32 | 10.15.2.1/32 | X | X | X | PERMIT |
| 4 | 10.15.16.1/32 | 10.15.0.0/16 | 6 | X | 21 | PERMIT |
| 5 | 10.15.16.1/32 | 10.16.0.0/16 | 6 | X | 21 | CF1-COPY |
| 6 | 10.15.16.1/32 | 0.0.0.0/0 | 6 | X | 21 | CF2-COPY |
| 7 | 10.15.16.1/32 | 10.15.3.1/32 | 6 | X | 80 | PERMIT |
| 8 | 10.15.16.1/32 | 0.0.0.0/0 | 6 | X | 80 | CF3-COPY |
| 9 | 10.15.16.1/32 | 10.15.0.0/16 | 6 | X | 22 | PERMIT |
| 10 | 10.15.16.1/32 | 10.16.1.1/32 | X | X | X | CF1 |
| 11 | 10.15.16.1/32 | 10.16.0.0/16 | 6 | X | 22 | CF3-COPY |
| 12 | 10.15.16.1/32 | 0.0.0.0/0 | 6 | X | 22 | DENY |

Fig. 5B

LOADBALANCING NETWORK TRAFFIC ACROSS MULTIPLE REMOTE INSPECTION DEVICES

RELATED APPLICATIONS

The present application is a divisional, and claims the priority under 35 U.S.C. §120, of U.S. patent application Ser. No. 12/315,780, filed Dec. 5, 2008, now U.S. Pat. No. 7,965,636 entitled "LOADBALANCING NETWORK TRAFFIC ACROSS MULTIPLE REMOTE INSPECTION DEVICES," which previous application is incorporated herein by reference in its entirety.

BACKGROUND

Computing networks can include multiple network devices such as routers, switches, hubs, servers, desktop PCs, laptops, workstations, and peripheral devices, e.g., printers, facsimile devices, and scanners, networked together across a local area network (LAN) and/or wide area network (WAN).

One advantage realized by networks is the ability to share network resources among dispersed clients. For example, networks can include checking functionalities, e.g., an intrusion system (IS), e.g., intrusion prevention system (IPS) and/or intrusion detection system (IDS) that serve to detect unwanted intrusions/activities to the computer network, as well as remediation servers that store operating system patches, virus definitions, etc. Unwanted network intrusions/activities may take the form of attacks through computer viruses and/or hackers, misconfigured devices among others, trying to access the network. To this end, an IS can identify different types of suspicious network traffic and network device usage that cannot be detected by a conventional firewall. This includes network attacks against vulnerable services, data driven attacks on applications, host based attacks such as privilege escalation, denial of service attacks, port scans, unauthorized logins and access to sensitive files, viruses, Trojan horses, and worms, among others.

To increase robustness, a network can contain multiple IS's, each with differing capabilities. In such a case, it is advantageous to direct traffic that needs to be examined to the IS device that meets the minimum capabilities for the type of traffic being sent, the security level assigned to both the sender and recipient of the traffic as well as the load on the IS. By balancing traffic across the multiple IS's, overall checking efficiency is improved.

BRIEF DESCRIPTION OF THE DRAWINGS

The accompanying drawings illustrate various examples of the principles described herein and are a part of the specification. The illustrated examples are merely examples and do not limit the scope of the claims.

FIG. 4 illustrates a checking functionality (CF) selection table that includes CF capabilities and characteristics per tunnel to which identified packets can be sent according to examples of the principles disclosed herein.

FIG. 5A is a table illustrating possible classification of packets that may be sent to a CF, shown at a high level.

FIG. 5B is a table similar to FIG. 5A, illustrating examples of real addresses, protocol and port numbers in an actual working environment.

Throughout the drawings, identical reference numbers designate similar, but not necessarily identical, elements.

DETAILED DESCRIPTION

Examples of the principles disclosed herein may include network devices, systems, and methods, including executable instructions and/or logic. In one example of the principles disclosed herein, a method includes using logic on a first network device to select a checking functionality based on a number of criteria. The method uses logic on the first network device to select the checking functionality from a list of checking functionalities. The checking functionality is selected for processing packets identified by the first network device. Logic on the first network device is used to tunnel packets to a second network device that is associated with the selected checking functionality. The second network device has a destination address different from an original destination address of identified packets. The second network device sends the original packet to the selected CF, where it is examined for security violations, viruses, etc., as appropriate.

Figure 1:
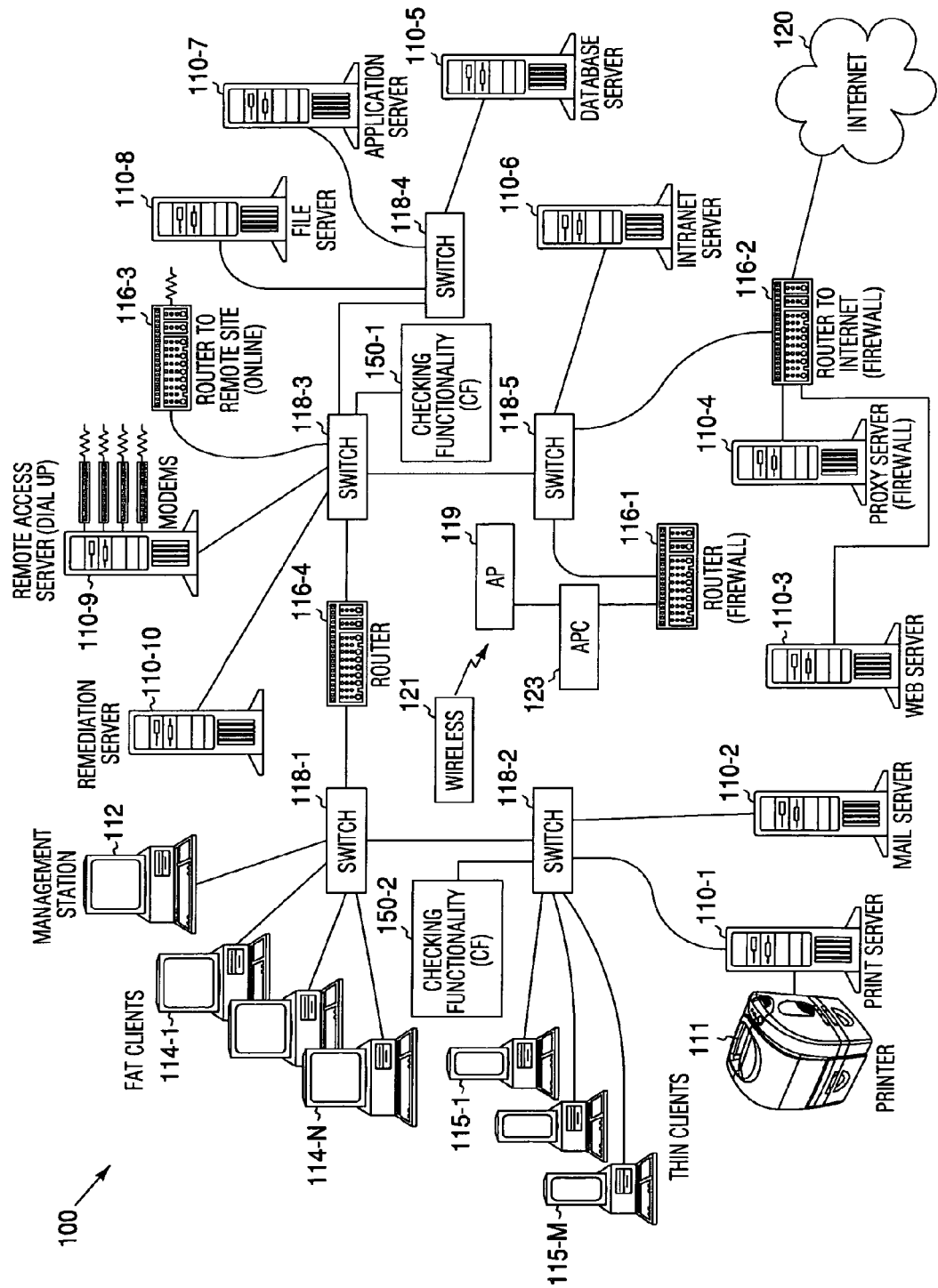
FIG. 1 illustrates an example of a computing device network.

FIG. 1 illustrates an example of a computing device network 100. As shown in FIG. 1, a number devices can be networked together in a LAN and/or WAN via routers, hubs, switches and the like. As used herein a "network device" means a switch, router, hub, bridge, etc., e.g., a device having processor and memory resources and connected to a network 100, as the same will be understood by one of ordinary skill in the art. Although the term switch will often be used herein, those skilled in the art will realize that examples may be implemented with other network devices. As the reader will appreciate, the term network device can also be used to refer to servers, PCs, etc., as illustrated further below.

The example network of FIG. 1 illustrates a print server 110-1 and printer 111 to handle print jobs for the network 100, a mail server 110-2, a web server 110-3, a proxy server (firewall) 110-4, a database server 110-5, an intranet server 110-6, an application server 110-7, a file server 110-8, and a remote access server 110-9. A server, database server 110-5 for example, could serve as a Checking Functionality (CF) server, storing the list of available CFs for the network (where a CF can be an IS, counting device, accounting device, remediation device, Access Point Controller, etc.). The examples described here do not provide an exhaustive list of servers or CFs that may be used in a network.

The example of FIG. 1 further illustrates a network management station 112, e.g., a server, PC and/or workstation, a number of "fat" clients 114-1, . . . , 114-N which can also include PCs and workstations and/or laptops, and a number of "thin" clients 115-1, . . . , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

As used with respect to FIG. 1, the designators "N" and "M" indicate that a number of fat or thin clients can be attached to the network 100. The number that N represents can be the same or different from the number represented by M. The example of FIG. 1, illustrates that all of these example network devices can be connected to one another and/or to other networks using routers, 116-1, 116-2, 116-3, and 116-4, and hubs and/or switches 118-1, 118-2, 118-3, 118-4, and 118-5. As noted above, such network devices can include a processor in communication with a memory and may include network chips having hardware logic, e.g., in the form of application specific integrated circuits (ASICs), associated with the number of network ports. The term "network" as used herein is not limited to the number, type, and/or configuration of network devices illustrated in FIG. 1

As one of ordinary skill in the art will appreciate, many of the network devices (e.g., switches 118-1, 118-2, 118-3, 118-4, 118-5 and/or hubs can include a processor in communication with a memory and will include network chips having logic, e.g., application specific integrated circuits (ASICs), and a number of network ports associated with such logic. By way of example and not by way of limitation, the network management station 112 includes a processor and memory. Examples of the various devices in the network are not limited to a number of ports, network chips and/or the type or size of processor or memory resources.

Additionally as the reader will appreciate, a number of mobile devices, e.g., wireless device 121, can connect to the network 100 via a wireless air interface (e.g., 802.11) which can provide a signal link between the mobile device 121 and an access point (AP) 119. The AP 119 serves a similar role to the base station in a wireless network, as the same will be known and understood by one of ordinary skill in the art. As shown in FIG. 1, the AP 119 can be linked to an access point controller (APC) 123, as the same will be known and understood by one of ordinary skill in the art, which connects the AP 119 over a packet switched signal link, e.g. an Ethernet link, to other network devices, e.g., router 116-1. In other topologies, the APC 123 need not be in the path between the AP 119 and the rest of the network 100, i.e., the AP 119 may connect directly to router 116-1, and the APC 123 may connect to switch 118-2. Additionally, the AP 119 and APC 123 may be one and the same, or even integrated into one of the other network devices, e.g., router 116-1.

As one of ordinary skill in the art will appreciate, each network device in the network 100 can be physically associated with a port of a switch to which it is connected. Information in the form of packets can be passed through the network 100. Users physically connect to the network through ports on the network 100. Data frames, or packets, can be transferred between network devices by means of a network device's, e.g., switch's, logic link control (LLC)/media access control (MAC) circuitry, or "engines", as associated with ports on a network device. A network switch forwards packets received from a transmitting network device to a destination network device based on the header information in received packets. A network device can also forward packets from a given network to other networks through ports on one or more other network devices. As the reader will appreciate an Ethernet network is described herein. However, examples are not limited to use in an Ethernet network, and may be equally well suited to other network types, e.g., asynchronous transfer mode (ATM) networks, etc.

As used herein, the term "network appliance" is used to mean an add-on device, e.g., "plug-in" or "application module," to a network as contrasted with a "network device", e.g., router, switch, and/or hub, etc., which are sometimes considered more as "backbone" component devices to a network. As the reader will appreciate, a network appliance, e.g., checking functionality 150-1 or 150-2 can include processor and memory resources capable of storing and executing instructions to perform a particular role or function. A network appliance can also include one or more network chips, e.g., ASICs, having logic and a number of ports, as the same will be known and understood by one of ordinary skill in the art.

In the example network implementation of FIG. 1 a checking functionality (CF) 150-1 is shown in association with switch 118-3, and a CF, 150-2 is shown in association with switch 118-2. In certain examples, the checking functionality performed by a network appliance, e.g. checking functionality 150-1 or 150-2 can perform the role of an intrusion prevention system (IPS), as may be supplied by a third party vendor of network security devices. In certain examples, the checking functionality 150-1 or 150-2 can perform the role of an intrusion detection system (IDS), or another diagnostic device, accounting device, counting device, etc., as may be supplied by a third party vendor.

As used herein, a network can provide a communication system that links two or more computers and peripheral devices, and allows users to access resources on other computers and exchange messages with other users. A network allows users to share resources on their own systems with other network users and to access information on centrally located systems or systems that are located at remote offices. It may provide connections to the Internet or to the networks of other organizations. Users may interact with network-enabled software applications to make a network request, such as to get a file or print on a network printer. Applications may also communicate with network management software, which can interact with network hardware to transmit information between devices on the network.

Figure 2:
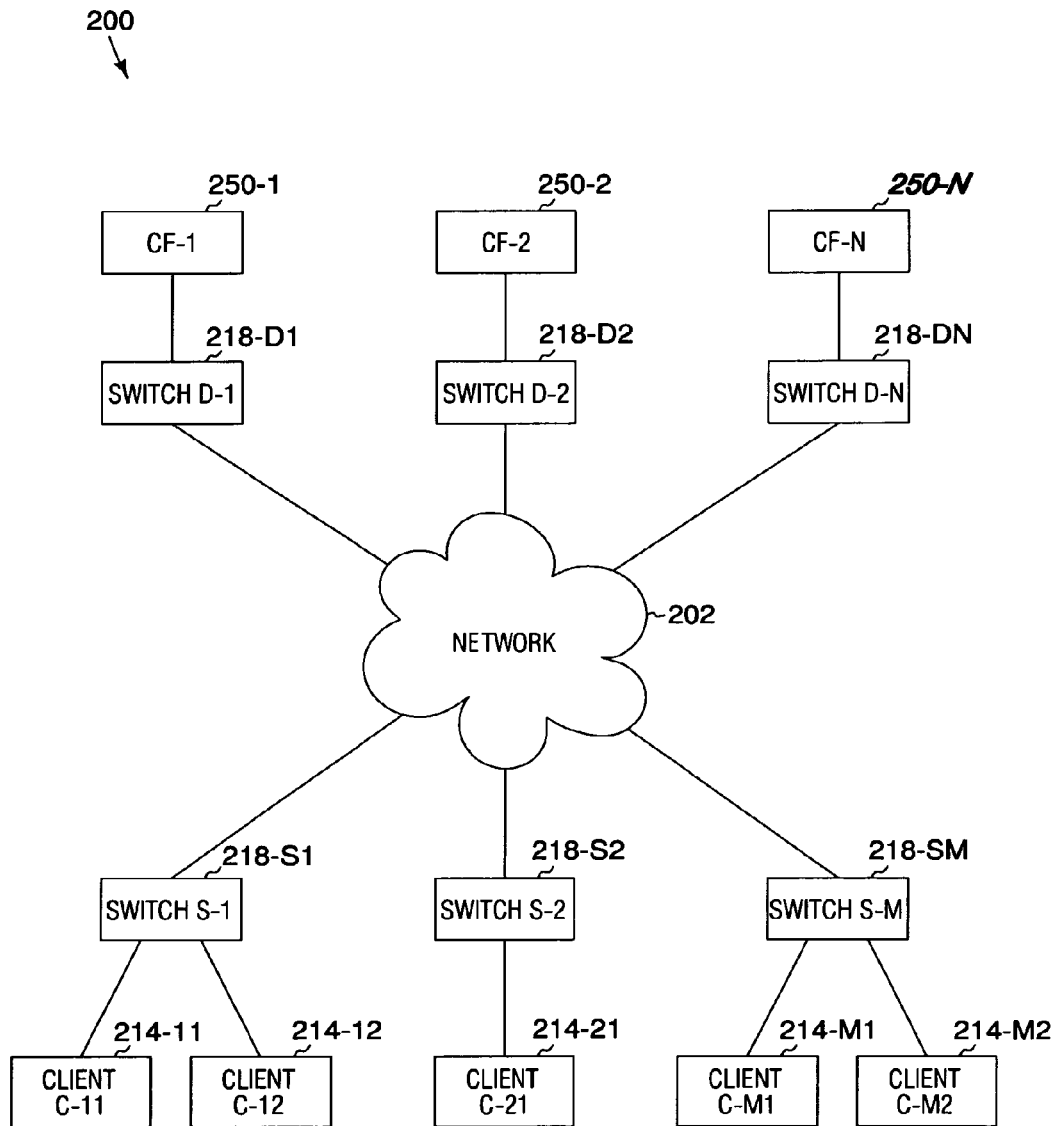
FIG. 2 is a block diagram illustrating a portion of a network, such as shown in FIG. 1, having network devices which can implement examples of the principles disclosed herein.

FIG. 2 is a block diagram illustrating a portion 200 of a network, such as shown in FIG. 1, having network devices 218-S1, 218-S2, . . . , 218-SM, and 218-D1, 218-D2, . . . , 218-DN, e.g., switches, which can implement examples of the principles disclosed herein.

Although reference is often made herein to switches, those skilled in the art will realize that examples of the invention may be implemented in other network devices. Examples of other network devices include, but are not limited to, wireless and/or wired routers, switches, hubs, bridges, etc., e.g., intelligent network devices having processor and memory resources.

The source, e.g., "first," switches 218-S1, 218-S2, . . . , 218-SM are each connected to a number of clients, 214-11, 214-12, . . . , 214-21, . . . , 214-M1, 214-M2. The switches 218-S1, 218-S2, . . . , 218-SM are also connected to a network 202 such as network 100 shown in FIG. 1. Destination, e.g., "second," switches 218-D1, 218-D2, . . . , 218-DN are each connected to a checking functionality (CF) 250-1, 250-2, . . . , 250-N. The destination switches 218-D1, 218-D2, . . . , 218-DN are also connected to the network 202 linking them to the source switches. As used with respect to FIG. 2, the designators "N" and "M" illustrate that various networks can have various numbers of clients and network devices, e.g., switches.

A client, such as client 214-11 could send network traffic, e.g., packets, through switch 218-S1. As described in more detail in connection with FIG. 3, switch 218-S1 can have logic to identify packets for tunneling to a checking functionality. In the example illustrated in FIG. 2, logic on switch 218-S1 can select a checking functionality, e.g., 250-2, from a list, such as that illustrated in CF capabilities table 460 in FIG. 4. Once switch 218-S1 selects a checking functionality, it encapsulates and tunnels all identified packets from client 214-11 through the network 202 to the network device, e.g. 218-D2, that is associated with the selected checking functionality 250-2.

When a network device, e.g., switch 218-D2 receives the packets tunneled from switch 218-S1, logic on the switch 218-D2 can decapsulate the packets and forward them to a CF, e.g., 250-2 for processing. Methods for the creation and maintenance of tunnels between "first" switches, e.g. source switch 218-S1, and "second" switches, e.g. destination switch 218-D2, are described in detail in co-pending, commonly assigned U.S. patent application Ser. No. 11/827,742, entitled "Tunnel Configuration" and having at least one common inventor, filed Jul. 13, 2007 and is specifically incorporated by reference herein.

As is illustrated in FIG. 2, a number of clients, e.g., 214-11 and 214-12 can be connected to a given network device, e.g., switch 218-S1. Furthermore, a switch 218-S1 can tunnel packets from multiple clients, 214-11 and 214-12, to one or more particular CFs, e.g. CF 250-1 that are selected (based upon criteria that will be hereinafter described) via one or more second network devices, e.g., switch 218-D1.

A checking functionality can be performed by a network appliance separate from a network device, e.g., CF 150-2 in FIG. 1. Alternatively, a network device, e.g., switch 218-D1 in FIG. 2 can have a checking functionality integrated onboard the network device.

Although reference is made herein to a "first", e.g., "source" network device and a "second", e.g., "destination" network device, either network device could perform the functions of source and destination network devices as described herein. The terms "first" or "source" and "second' or "destination" are used merely to aid in understanding the various functions of network devices as they perform operations according to examples described herein.

As the reader will appreciate, a network device that is either connected to a CF, or has a CF integrated onboard the network device, e.g. a destination network device, could also receive packets from a client and tunnel identified packets to a different network device. As stated above, a given network device can perform the operations of either a "first" or "second" network device.

Figure 3:
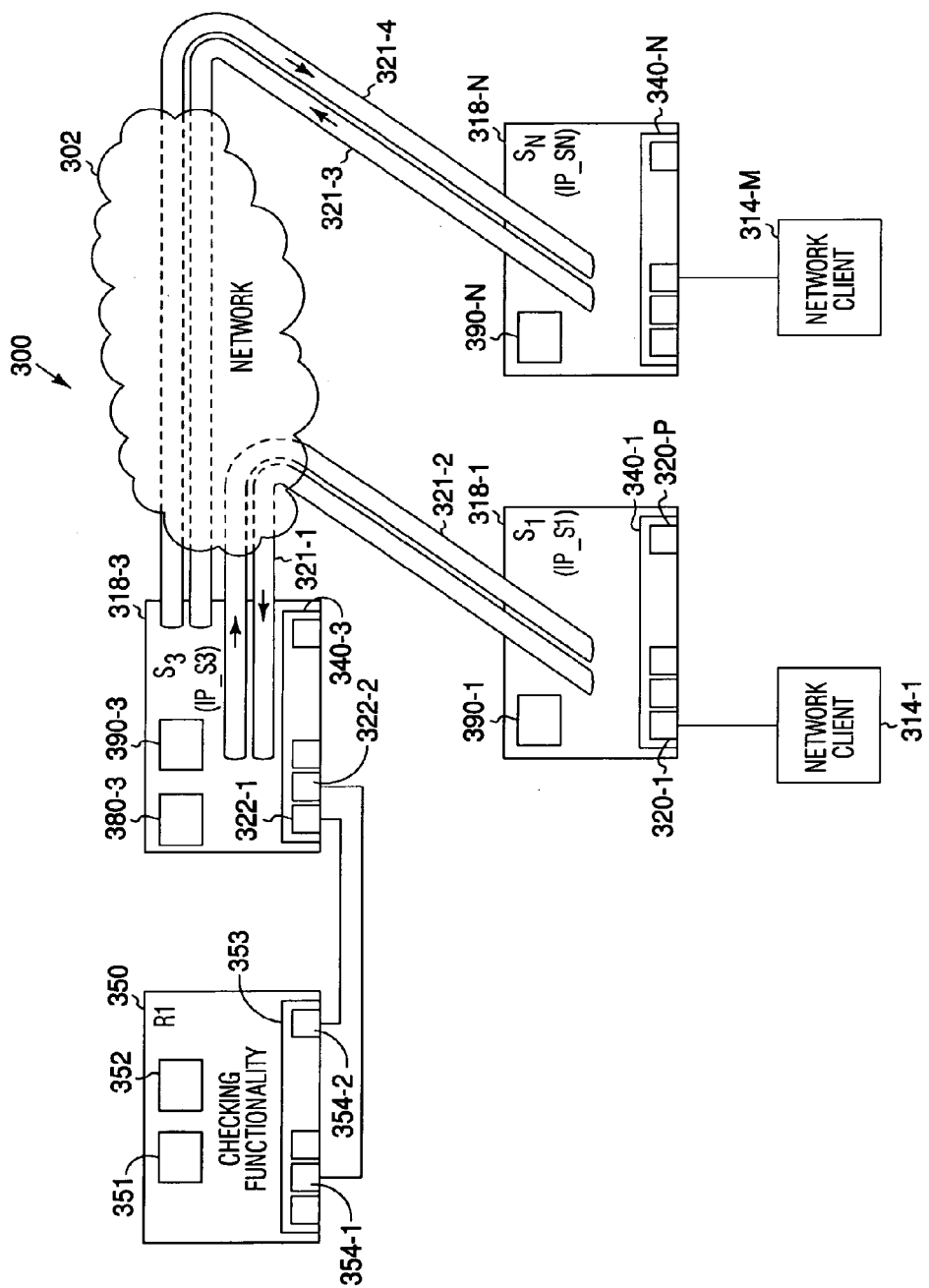
FIG. 3 illustrates a portion of a network, such as shown in FIG. 1, including network devices suited to implement examples of the principles disclosed herein.

FIG. 3 illustrates a portion 300 of a network, e.g., network 100 shown in FIG. 1, including network devices, 318-1, 318-3, . . . 318-N suited to implement examples of the principles disclosed herein. Certain devices are referred to as "source" network devices and other network devices are referred to as "destination" network devices. As used herein, "source" network devices means network devices, e.g., 318-1, having ports connected directly or indirectly to network clients, 314-1, . . . 314-M. The network clients can include servers, "fat" and "thin" clients, including mobile network clients connected through an APC, etc., as discussed above in connection with FIG. 1. As used herein, "destination" network devices means network devices, e.g., 318-3, which are associated with checking functionalities (CFs), e.g., CF 350. Destination network devices can be associated with an external CF, as shown at 350, or can have a CF integrated onboard the network device, as shown at 380-3.

As described in connection with FIG. 1, the various network devices, 318-1, 318-3, . . . 318-N, can include switches, routers, hubs, etc. (shown as switches in FIG. 3). Such network devices, 318-1, 318-3, . . . 318-N, can include processor(s), and memory resources. The network devices, 318-1, 318-3, . . . 318-N, can similarly include a number of network chips, e.g., 340-1, 340-3, . . . , 340-N, including logic circuitry (hardware) which can execute instructions and/or logic and each network chip, 340-1, . . . , 340-N, can include a number of network ports, 320-1, . . . , 320-P, and 322-1, 322-2, to send and receive packets (network traffic) throughout the network 302. As mentioned above, the logic circuitry of the number of network chips, e.g., 340-1, . . . , 340-N, can be in the form of an application specific integrated circuit (ASIC) and include logic to serve as a media access controller (MAC).

As shown in FIG. 3, a number of ports 320-1, . . . , 320-P can be included on a network chip 340-1, . . . , 340-N and have access to logic circuitry associated with a network chip 340-1, . . . , 340-N and to the processor and memory. As used with respect to FIG. 3, the designators "N" and "P" are used to illustrate that various networks can have a various number of network devices, various numbers of network clients, and various network devices in a network may support or contain a various and/or different number of ports. Examples are not limited to the example shown in FIG. 3.

As shown in the example of FIG. 3, a CF 350 can be connected to a network device, e.g., 318-3, which may be a destination network device. The CF 350 could also be provided as part of one or more switches, e.g., 318-3 at 380-3. As shown in FIG. 3, the CF 350 can include processor 351 and memory 352 resources capable of storing and executing instructions to perform a particular role or function. The CF can also include one or more chips (ASICs), e.g., 353, having logic and a number of ports, e.g., 354-1 and 354-2, as the same have been described above.

In various examples, the CF 350 is an intrusion prevention system (IPS), as may be supplied by a third party vendor of network security devices. In various examples, the CF 350 can be an intrusion detections system (IDS), another diagnostic device, an accounting device, a counting device, an access device, etc., as may be supplied by a third party vendor. Additionally, a CF may be a remediation server associated with a remediation VLAN, as noted above. Examples are not limited to the examples given here. Further, the various operations of such devices will be recognized and understood by one of ordinary skill in the art.

In the example of FIG. 3, a packet is received from a port, e.g., 320-1, on a network device, e.g., switch 318-1, from a network client, e.g., 314-1. According to various examples, logic on the switch 318-1, e.g., logic associated with the hardware of the network chip 340-1, can identify original packets, which are received from or destined to a particular port, e.g., 320-1, on the device 318-1.

In various examples, the logic selects a CF, e.g., 350, from a list, 390-1, 390-N, also tables 460 in FIG. 4A, of available CFs. The list of available CFs can include the network addresses of the CFs. The network addresses can be internet protocol (IP) addresses, among others.

According to various examples, the identified packets are tunnel encapsulated to tunnel the identified packets to a second network device, which may be a destination network device, e.g., switch (S3) 318-3, having a location different (e.g., remote) from an original MAC destination address of the identified packets. That is, the identified packets are sent via a tunnel (e.g., 321-1) to the second network device, e.g., 318-3, rather than forwarding the selected packets to their original MAC destination address. As the reader will appreciate, the tunnel may be a secure tunnel.

FIG. 4 illustrates a table 460 used to select a checking functionality (CF) to which identified packets should be sent according to examples of the principles disclosed herein. That is, table 460 is populated with information used by logic of the first network device, e.g. source switch S-1 218-S1 from FIG. 2, to select a CF to which identified packets should be sent, among other uses. The logic of the first network device uses table 460 (e.g., 390-1) to determine which CF should be utilized for the type of service and CF capabilities that may be required.

In some examples, the logic can select a CF from the list in the order of the list such that it matches packets from a first client with a first CF, packets from a second client with a second CF, etc. Logic on the network device cycles through the order, sequentially selecting a CF for packets tunneled from successive clients. Once a CF has been selected for a given client, all packets from that client that are selected for tunneling are tunneled to the same CF. A CF can function more effectively when all packets that are part of the same flow are checked by the same CF.

In various examples, the logic can select a CF based on traffic levels for each CF. Appropriate traffic levels for each CF can be determined based on the processing capacity of the CF, the network distance between a switch and the CF, how much traffic has already been allocated to the CF, among other means. As used here, "network distance" takes into account more than just physical distance. Network distance can also include link speeds and latency. For example, it can be advantageous to use high bandwidth, low latency links, even if the physical distance is longer.

In other examples, the logic can select a CF based additionally on the client's credentials, the destination of the packet and the type of traffic being carried in the packet. The example illustrated here is not intended to limit the types of selection criteria.

The table 460 includes column 461 "TUNNEL/CF NUMBER" for indicating available checking functionalities and an associated tunnel number. Column 462 "DESTINATION SWITCH IP ADDRESS" indicates the destination address of the network device associated with a given CF. Column 463 indicates the CF capabilities. Column 464 "CF COST METRIC" indicates the relative cost of sending packets to each checking functionality. Column 465 "TRANSMITTED PACKET/BYTE COUNT" indicates the numbers of packets and bytes, tunneled to each CF. Column 466 "SECURITY/AUTHENTICATION INFORMATION" indicates security information which can be used to generate authentication or encryption information for the tunneled traffic according to one or more examples of the principles disclosed herein.

In the example illustrated in FIG. 4, Column 461 indicates that there are at least three possible CFs available. By way of example, and not by way of limitation, tunnel number 0 may be associated with CF-1, e.g., 250-1 in FIG. 2. Tunnel number 1 may be associated with CF-2, e.g., 250-2 in FIG. 2. Tunnel number N may be associated with CF-N, e.g., 250-N in FIG. 2. However, the designator "N" is intended to represent that a number of different CFs may be available. In various examples, the number of available CFs may be fewer or greater than three. The example illustrated here is not intended to limit the number of network elements.

Column 462 indicates the IP addresses of second network devices associated with each CF. For example, IP-D1 may be associated with the IP address for destination switch D1 (218-D1) in FIG. 2. IP-D2 may be associated with the IP address for destination switch D2 (218-D2) in FIG. 2. IP-DN may be associated with the IP address for destination switch DN (218-DN) in FIG. 2.

Column 463 basically maintains a list of the capabilities of each CF, which is really a list of which protocols or services it understands and can inspect. For example, a CF may understand web traffic, email traffic, file transfer traffic, etc. and can so be listed as such. Other characteristics of interest may be the ability to perform advanced virus detection, firewalling, etc. For example, a low-end CF may only be able to implement simple Access Control List (ACL) policies, such as client A can not talk to client B, client A can not access the web, etc. A more comprehensive CF may have capabilities to inspect data to check for viruses, e.g. if client A is downloading email, a more advanced CF may be able to inspect the email and scan it for viruses, etc. The example illustrated here is not intended to limit the types of selection criteria possible.

Typically, the more advanced CF devices are, by their nature, more expensive. This is one of the motivations of this invention; by sending traffic for inspection to the appropriate CF (i.e., the CF that has the minimum capabilities associated with the level of checking that is determined necessary for the packet in question), efficiency is improved, which requires fewer high-end CFs.

Column 464 indicates the relative cost of sending network traffic to each checking functionality. In the example illustrated in FIG. 4, CF-1 has a cost metric of 3, CF-2 has a cost metric of 2, and CF-N has a cost metric of 1. This indicates that it is 3 times more "expensive" to send traffic to CF-1 than CF-3. In this context, "expensive" encompasses factors such as the performance capabilities of the CF, its buffering capabilities, the network distance to the CF, etc. Again, the examples illustrated here are not limited to these examples. Other methods of deriving cost metrics are possible and will be understood and practiced by those of skill in the art according to the present invention.

Column 465 indicates the number of packets and bytes, e.g., P0, b0, tunneled to each checking functionality. In this example, P0 may be associated with the number of packets tunneled to CF-1, and b0 may be associated with the number of bytes tunneled to the same checking functionality. P1 may be associated with the number of packets tunneled to CF-2, and b1 may be associated with the number of bytes tunneled to the same checking functionality. PN may be associated with the number of packets tunneled to CF-N, and bN may be associated with the number of bytes tunneled to the same checking functionality. This information can be used along with the CF cost metric as one method of determining to which CF a particular client's traffic should be sent.

Column 466 indicates stored security and authentication information for one or more checking functionalities. For example, KeyS1 may be associated with security information for CF-1. KeyS1 may be associated with security information for CF-2. KeySN may be associated with security information for CF-N.

In some examples, the tunnels can be secure tunnels. For example, a tunnel could include authentication to allow the destination network device to check that a tunneled packet truly did come from the source network device specified in the packet. Another example includes full encryption, which would fully protect the packet being tunneled from any snooping by others as it crosses the network.

In addition, there is no limitation on the number of tunnels that can be directed to any single destination switch (or checking functionality) from a single source switch. For example, two or more tunnel numbers may have identical destination switch IP addresses 462 but different security/authentication information 465. This allows tunneled traffic to be given different levels of security protection or sent via different network paths, for example.

Although the examples illustrated in FIG. 4 use switches as examples of network devices, examples are not so limited. As will be appreciated by one of ordinary skill in the art, other network devices can be used. Furthermore, the examples illustrated in FIG. 4, contain examples of information that can be stored in a CF capabilities table. The reader will appreciate that such a table could contain more or less information than is present in FIG. 4. Examples are not limited to the specific examples illustrated herein.

The characteristics of each CF are known ahead of time to the source switch. To populate this CF capabilities table (FIG. 4), a system administrator could manually enter the capabilities into the source switch, or in a more advanced scenario, there could be a higher level protocol running that allows the source switch to query the CF to find what its capabilities are. In this regard, there is a somewhat standard way of doing this: most networking devices maintain a "Management Information Base", or MIB, that contains much information about the device, possibly including a useful list of capabilities. Conversely, the CF could "push" its list of capabilities to each possible source switch.

It is also necessary to classify packets as they are sent from a client and arrive at the source switch, e.g., in FIG. 3, packets sent from client 314-1 that arrive at port 320-1 on source switch 318-1. To determine what type of data a packet is carrying, where it comes from and where it's going to, switch 314-1 will have logic to parse the packet and extract the pertinent information. Such parsing operations are standard practice in any network switch/router, etc., and are ordinarily used to determine where to forward the packet to. For example, a standard switch typically has logic to extract the MAC Destination Address (MAC DA) and MAC Source Address (MAC SA) from the packet, and will maintain forwarding tables to determine which port to send the packet to (based on the MAC DA). Such a forwarding table is populated by "learn" operations, e.g., when client 314-1 sends a packet, its own address will be the MAC SA of the packet. If this address is not already present in the forwarding table for switch 318-1, it will be "learned" and associated with port 320-1. Thus, when some other client sends a packet to client 314-1 and it arrives at switch 318-1, the switch knows to send the packet to port 320-1.

More advanced packet parsing can also be performed to extract other information from the packet. For example, routers, which operate using layer 3 (or most commonly, IP) addresses will extract at least the IP Destination Address (IP DA) from the packet as this must be used again to determine where to send the packet for a route operation. Commonly, the IP Source Address is also extracted, often for use in security functionality (e.g., Access Control Lists, or ACLs). The layer 4 protocol (transport layer) is also important at this point, as it helps to define the actual "service" that is associated with the packet. The most common layer 4 protocols are Transfer Control Protocol (TCP) and User Datagram Protocol (UDP), and these both contain source and destination port numbers that are also associated with the service. These port numbers are service port numbers, and have nothing to do with the physical ports on a switch, e.g., 320-1, etc.

The layer 5 protocol (application layer) can also be used to refine the service associated with the packet. For TCP or UDP transport layer, the destination port number indicates this service, e.g., if an IP packet carrying a TCP header with a destination port of 80 is identified, it is known that an attempt to connect to a web server using the HTTP protocol is being made. A similar analysis can also be applied to determine other traffic types, e.g. email typically uses SMTP (TCP port 25) or POP3 (TCP port 110); telnet or ssh (secure shell) are used to remotely log in to another machine on the network, and use TCP port 23 or 22; File Transfer Protocol (FTP) is used to transfer files between two computers and uses TCP port 21 for the control traffic.

In addition to classifying the packet as described above, it is also useful to know the actual person sending the packet. For most corporate networks, a login process is required to allow a user to access to the network. Thus when a user logs in, it is also necessary to validate their identity to the network so that the user is tied to the MAC (or IP) address of the client that the user is using, and potentially also including the higher level identifiers (L4 port numbers, etc.) This is important because a desktop machine may be used by several users at different times, or even simultaneously, to connect to the network, e.g., an open-use area in a company, or an internet cafe. It is therefore not necessarily possible to tie a MAC or IP address, etc. to a person without a login process. Additionally, IP addresses can be dynamically assigned at login—another reason for needing user credentials. If a login process is not required, less differentiation between users can be achieved, and so they then all have to be treated as somewhat suspect.

A final part of the process is to take the information obtained from the above described operation, i.e., what person is sending what type of data, and who are they sending it to, and use this to pick one of the CF devices from the CF capabilities table shown in FIG. 4. This can be generally done using existing Access Control List (ACL) functionality, but with a modification to allow an ACL action to send a packet to a CF.

Typically, ACLs are used for security purposes to either permit (allow) or deny (prevent) connections based on the IP addresses, IP protocol and layer 4 port numbers contained in the packet. For example, FIG. 5A shows a high-level ACL table with a number of entries. The IP_SA column identifies the IP address of the sender of the packet, i.e., really the user (as per above discussion regarding the login process), the IP_DA column identifies the packet destination (IP destination address), the service column identifies the service being requested (which can also include the protocol, source_port and dest_port, etc.), and the CF device column indicates the CF device that packets matching this ACL entry should be processed by (if a CF device is selected).

The FIG. 5A table is shown at a high level; in reality the table would have real IP addresses, protocol and port numbers, and an example of that is shown in FIG. 5B. In this table, the following is assumed: the clients IP address is 10.15.16.1 (i.e., this is the IP address of user "mark1"), the mail server is 10.15.1.1, the print server is 10.15.2.1, the internal web server is 10.15.3.1 and the remote accounting server is 10.16.1.1. In addition, all addresses from 10.15.0.0 to 10.15.255.255 (i.e., 10.15.0.0/16) are considered "local", all addresses from 10.16.0.0 to 10.16.255.255 (i.e., 10.16.0.0/16) are considered "remote", and all other IP addresses are considered external. For such assumptions, FIG. 5B follows.

This extended ACL table is generally set up by software running on the logic circuitry 340-1 of the source switch 318-1, although it could be done equally as well using dedicated hardware on 340-1. The initial policies can be determined by a network administrator, e.g., the above FIG. 5B table could be the set of policies attached to user mark1 and stored by software. Once the source switch 318-1 detects a login by user mark1, this set of policies is loaded into the extended ACL table. Note here that all of the src_port values are initially "X", i.e., don't care, and some of the ip_da fields cover a large range of destinations (e.g., line 4 has 10.15.0.0/16, which really means 10.15.X.X and covers the address range 10.15.0.0 to 10.15.255.255, which is 64k addresses, as is readily known to those skilled in the art).

There is a subtle difference here for how the CFs are specified in the FIG. 5B table. If an entry in the table can cover a range of addresses (e.g., entries 5, 6, 8 and 11) that need to be processed by a CF, then the action is CFX-COPY. This indicates that the packet needs to be copied to software to make a determination as to which CF to truly use. This is described below. Also, it is not a requirement to specify this CFX-COPY action for a range of addresses—for example, on entry 8, we could just specify this as "CF3" such that all HTTP connections from user mark1 to any external web server go to CF3.

For entries marked as CFX-COPY, they are refined as actual connections are made, as follows: as a client opens up connections to a number of destinations, new entries will be added to the table where the traffic is being directed to a CF. For example, if mark1 sends a packet that matches entry 8 (accessing an external web server), and the ip_da is 15.100.1.1, then we would see a new entry 8a added to the table above the original entry 8—

| 8a | 10.15.16.1/32 | 15.100.1.1/32 | 6 | 9000 | 80 | CF3 |

In this case, this connection has been assigned to CF3, but it could be any of the CFs that have the capabilities to process web traffic. Also, the src_port has now also been assigned a value (9000 in this case), but this value is somewhat arbitrary—it will be read from the src_port field of the TCP header of the packet. How the client picks the src_port number depends on the Operating System and network stack, and is not relevant for the purposes of this discussion. All this value does is to allow a client to open multiple connections to the same IP_DA and service (ip_protocol and dst_port), with the connections being distinguished by different src_port values, as is known by those skilled in the networking art.

Again, assume that mark1 opens up another web connection to a different server, e.g., ip_da is 15.100.10.10, then we may assign this connection to CF2 and thus would create another entry:

| 8b | 10.15.16.1/32 | 15.100.10.10/32 | 6 | 9001 | 80 | CF2 |

The ordering of these entries is important—

| 8a | 10.15.16.1/32 | 15.100.1.1/32 | 6 | 9000 | 80 | CF3 |
| 8b | 10.15.16.1/32 | 15.100.10.10/32 | 6 | 9001 | 80 | CF2 |
| 8 | 10.15.16.1/32 | 0.0.0.0/0 | 6 | X | 80 | CF3-COPY |

Inasmuch as entries 8a and 8b are more specific than 8 (i.e., they specify an exact destination address as opposed to a range), they must appear in the ACL table before entry 8 (if they did not, they would never be matched against). The ACL table is really a list of entries that is compared against, and the first match that is found generates the result, which is why we have the ordering requirement of most specific matches first.

To determine which CF to send traffic to when a new connection is opened up, software running on the logic circuitry 340-1 of the source switch 318-1 will determine the type of connection that is being attempted (e.g., http access to external_web_server), and compare this with the capabilities of each CF stored in the CF capabilities column (463) of table 460 of FIG. 4. This operation will generate a list of capable CFs, and from this one can be chosen based on an algorithm using the CF cost metrics (464) and the perceived load placed on the CF by this source switch (derived from the transmitted packet/byte counts, 465). In general it is preferable to pick the CF with the lowest cost metric that has the lowest load, although any algorithm could be developed and other parameters could also be introduced. For example, a simple algorithm would be to generate an estimate of the load on the CF by using the packet counter to calculate the number of packets sent to the CF in, say, the last second (i.e., a packet rate). If this is then divided by the maximum load that the CF can process (which can be a part of the CF capabilities, and may be static or dynamic, allowing the CF to indicate its loading by other source switches), an approximate "load factor" on the CF from the source switch is obtained. If the load factor is then multiplied by the CF cost metric, a cost-busyness value is obtained. Higher values indicate less desirable CFs (i.e., the CF is either busy, expensive to use, or a combination of both of these), and so picking the CF with the lowest value would be one method of choosing a CF.

Other algorithms are also feasible, and it is also possible for the administrator to override any algorithm for specific traffic types, e.g., always send all web traffic destined to external web servers to CF3. Such an override permits specific company security policies to be enforced.

Figure 6:
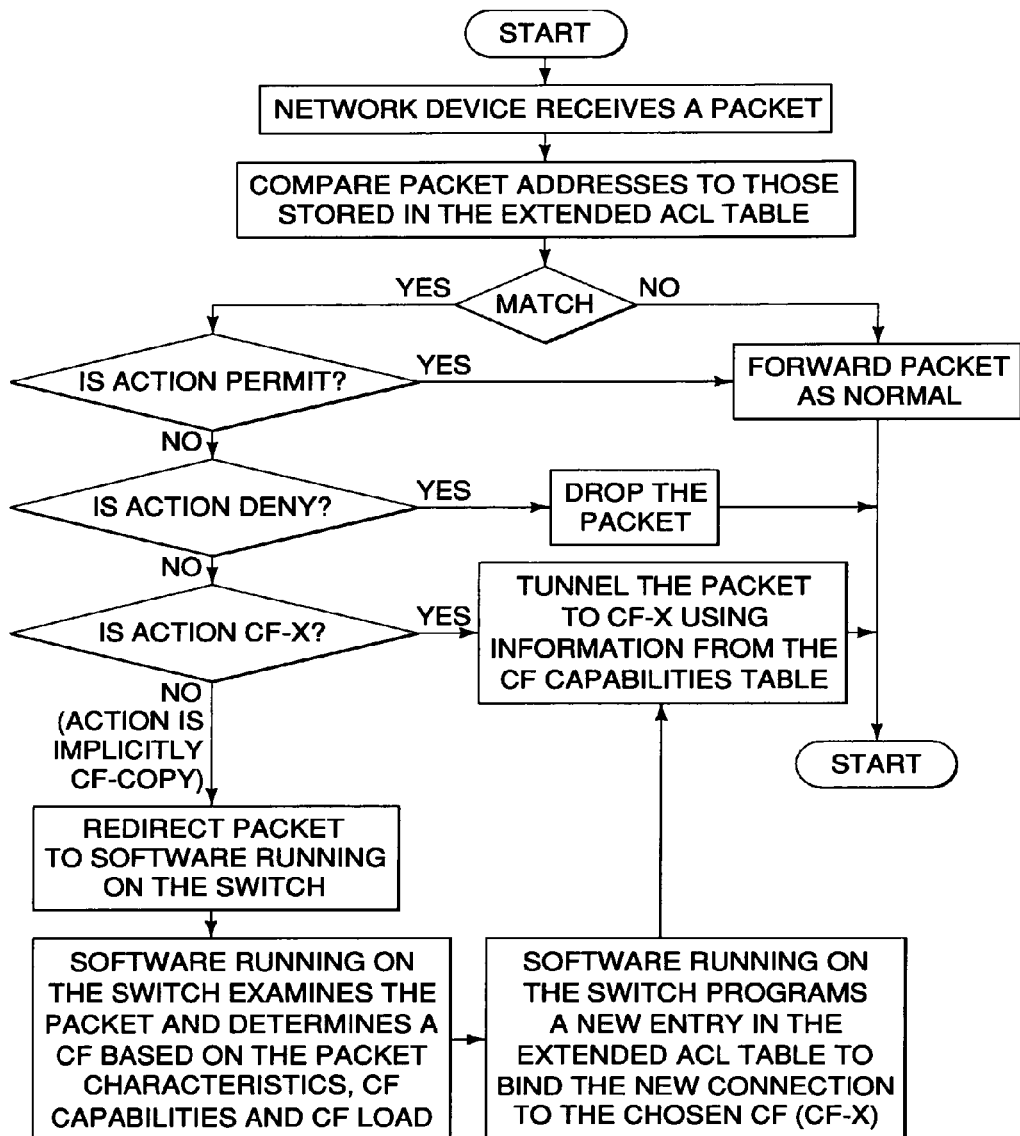
FIG. 6 provides a flow chart illustrating the general operation of examples of the principles disclosed herein.

The above operation is also set forth in the form of a flow chart shown in FIG. 6, which is not independently described, because it is largely self explanatory.

It should also be understood that most connections are actually bi-directional, e.g., if a request for data is made, the response is the data. Typically, an advanced CF may need to see the data in both directions so it can make a better determination as to the security risk, etc., of the operation being performed. The simplest way to do this is for the source switch to also program an ACL entry for the return data when it programs the initial entry for a new connection. For example, from the discussion above, when we add entry 8a (shown again here)

| 8a | 10.15.16.1/32 | 15.100.1.1/32 | 6 | 9000 | 80 | CF3 | to the ACL table, another entry 8aR for the return data from the server can also be set up, as indicated:

| 8aR | 15.100.1.1/32 | 10.15.16.1/32 | 6 | 80 | 9000 | CF3 |

One problem with the above is that it is desired to enforce security checks on the edge of the network, and so the original source switch for the client may not be the correct place to do the inspection for the response packets. For example, and referring to FIG. 1, if it is assumed that client 114-1 is the client under discussion above, then switch 118-1 would be the source switch for this client. However, if the client is communicating with an external web server, the return traffic from this server would likely arrive from the internet 120, and in this case the first switch (it is actually a router in this case, but that is immaterial) is 116-2. Thus, for the return traffic, the source switch is now really 116-2.

The problem here is when a client first starts a new connection and an ACL entry is added (e.g., entry 8a above) to the first source switch (118-1 in FIG. 1), what is really needed is to determine the source switch for the return data (this will be switch 116-2 in this case) and inform this switch that it needs to add an ACL entry to its table for the return data (i.e., it would need to add entry 8aR to its ACL table, and this entry would not be added to switch 118-1).

In effect, it is desirable to apply a "network policy" to ensure that the return data goes to the same CF. Rather than trying to determine the source switch for the return data and notifying it to add an ACL entry to its table, as described above, it is more robust to have the complete network know about the checking policies applied. In this case, the information presented in the table of FIG. 5B would be known to all switches (or strictly, all "edge" switches) in the network. Referring to FIG. 1, all of the switches 118-1 to 118-5 have clients or servers attached, and so are edge switches, as are routers 116-1, 116-2 and 116-3 (these have connections to wireless clients (116-1), or to external links (116-2 and 116-3)). Note, however, that router 116-4 would not be considered an edge device in this case, as it only connects to other network switches or routers, and not to any clients. Thus, when a client sends a packet for a new connection, an ACL entry will be added to the source switch (i.e., add entry 8a to source switch 118-1 for client 114-1). When the packet, that in this case is destined for the internet 120, arrives at switch (router) 116-2, this switch will recognise that it is the "edge" switch for this packet as it leaves the network, and so will also be the edge switch for the return packet from the external web server (in this example). Thus, switch 116-2 will add entry 8aR to its ACL table, in preparation for the return data from the web server. Alternatively, all edge switches could be informed of the return entry 8aR (but not program it into their tables until they see a return packet), since in some network topologies the return path is not the same as the forward path.

It is to be understood that the above description has been made in an illustrative fashion, and not a restrictive one. Although specific examples have been illustrated and described herein, those of ordinary skill in the art will appreciate that other component arrangements and device logic can be substituted for the specific examples shown. The claims are intended to cover such adaptations or variations of examples of the principles disclosed herein, except to the extent limited by the prior art.

In the foregoing Detailed Description, various features are grouped together in a single example for the purpose of streamlining the disclosure. This method of description is not to be interpreted as reflecting an intention that any claim requires more features than are expressly recited in the claim. Rather, as the following claims reflect, inventive subject matter lies in less than all features of a single disclosed example. Thus, the following claims are hereby incorporated into the Detailed Description, with each claim standing on its own as a separate example of the invention.

What is claimed is:

1. An apparatus containing a checking function (CF) among multiple checking functionalities in a network comprising:
    logic circuitry to receive a data packet forwarded by at least one source switch that is operatively connected to at least one client and multiple available CFs in said network, said switch routing data packets based on reported packet processing capabilities of the CFs;
    logic circuitry to process data packets to provide a particular processing capability comprising a particular checking function;
    logic circuitry to communicate an identification of that particular checking function to the at least one source switch; and
    logic circuitry to send a processed data packet to at least one destination switch.

2. The apparatus of claim 1, wherein said logic circuitry to process data packets comprises encryption processing.

3. The apparatus of claim 1, wherein said logic circuitry to process data packets comprises authentication processing.

4. The apparatus of claim 1, further comprising logic circuitry to accept two or more different tunnels with different security mechanisms between said source switch and said CF.

5. The apparatus of claim 1, wherein said CF is one of an Intrusion Detection System or an Intrusion Prevention System.

6. The apparatus of claim 1, wherein said logic circuitry to communicate the particular checking function to at least one source switch comprises a protocol for communicating with said at least one source switch.

7. The apparatus of claim 6, wherein said protocol is one of a push protocol or a pull protocol.

8. An apparatus comprising:
    a checking functionality (CF) for processing data packets in a computer network that comprises a plurality of CFs, said CF comprising
        an interface for communication with one or more source switches that route data packets to said CF for processing,
        a packet processing capability for processing said data packets, and
        logic circuitry for communicating data regarding said packet processing capability to said source switch through said interface;
        wherein said interface accepts two or more different tunnels with different security mechanisms between said source switch and said CF.

9. The apparatus of claim 8, wherein said packet processing capability for processing data packets comprises encryption processing.

10. The apparatus of claim 8, wherein said packet processing capability for processing data packets comprises authentication processing.

11. The apparatus of claim 8, wherein the CF is one of an Intrusion Detection System or an Intrusion Prevention System.

12. A source switch for routing packets among a plurality of checking functionalities (CFs) available in a network, said source switch comprising:
    logic circuitry to receive information from said plurality of CFs, said information specifying different checking functions within processing capabilities of said CFs available in the network; and
    logic circuitry to select a particular CF from among said plurality of CFs for processing a particular packet, wherein said particular CF is selected based on that particular CF's ability to provide a desired checking function from among said different checking functions within the processing capabilities of said CFs available in the network.

13. The source switch of claim 12, wherein said source switch distributes packets to said plurality of CFs based on said selection of particular CFs by capability to process particular packets.

14. The source switch of claim 12, further comprising a user interface through which a system administrator can enter said information about different processing capabilities of said CFs available in the network.

15. The source switch of claim 12, further comprising a network interface for forming two or more different tunnels with different security mechanisms between said source switch and a selected CF.

16. The source switch of claim 12, further comprising a table listing said different processing capabilities of said CFs available in the network.

17. The source switch of claim 12, wherein said logic circuitry to receive information about different processing capabilities of said CFs available in the network comprises a protocol for communication with said CFs.

18. The source switch of claim 12, wherein said logic circuitry to select a particular CF comprises logic circuitry for selecting a CF that has minimum characteristics specified to process the particular packet.

19. The source switch of claim 12, wherein said logic circuitry to select a particular CF considers a perceived load on different CFs of said plurality of CFs to determine a selected CF.

* * * * *